(12) United States Patent
Kashima

(10) Patent No.: US 9,447,370 B2
(45) Date of Patent: Sep. 20, 2016

(54) DISTILLED LIQUORS AND SPIRITS HAVING THE FRESH AND NATURAL FRAGRANCE OF SHISO AND PROCESSES FOR PRODUCING THE SAME

(75) Inventor: Takanori Kashima, Kawasaki (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 638 days.

(21) Appl. No.: 13/474,517

(22) Filed: May 17, 2012

(65) Prior Publication Data
US 2012/0225183 A1    Sep. 6, 2012

Related U.S. Application Data

(62) Division of application No. 12/663,947, filed as application No. PCT/JP2008/060826 on Jun. 13, 2008, now abandoned.

(30) Foreign Application Priority Data

Jun. 14, 2007    (JP) ................. 2007-156984

(51) Int. Cl.
| | | |
|---|---|---|
| *C12G 3/12* | (2006.01) | |
| *C12G 3/04* | (2006.01) | |
| *C12G 3/06* | (2006.01) | |

(52) U.S. Cl.
CPC . *C12G 3/12* (2013.01); *C12G 3/04* (2013.01); *C12G 3/06* (2013.01)

(58) Field of Classification Search
CPC ............. C12G 3/04; C12G 3/06; C12G 3/12
USPC ....................................................... 426/592
See application file for complete search history.

(56) References Cited

U.S. PATENT DOCUMENTS

| | | |
|---|---|---|
| 5,972,411 A | 10/1999 | Goldstein et al. |
| 6,395,315 B1 | 5/2002 | Matsuura |
| 2007/0092623 A1 | 4/2007 | Shimizu et al. |

FOREIGN PATENT DOCUMENTS

| | | | |
|---|---|---|---|
| JP | 61-015682 A | | 1/1986 |
| JP | 61015682 A | * | 1/1986 |
| JP | 62011085 A | | 1/1987 |
| JP | 04117274 A | | 4/1992 |
| JP | 0619752 A | | 6/1994 |
| JP | 07000172 A | | 1/1995 |
| JP | 2002017333 A | | 1/2002 |
| JP | 2005029552 A | | 2/2005 |
| JP | 2005-143503 | | 6/2005 |
| JP | 2007-060962 | | 3/2007 |
| JP | 2007060962 A | * | 3/2007 |

OTHER PUBLICATIONS

Nakamura et al., "Shiso no Buibetsu Oyobi Hikari Joken ni yoru Koki Seibun no Chigai", Soritsu 50 Shunen Kinen Symposium on the Chemistry of Terpenes, Essential Oils, and Aromatics, Nov. 6, 2006, pp. 19-20.
"<212 Doyo Hiroba> Tomakomai Muto Juice Hatsubai Sononamo 'Oishiso' 'Furusato Kozutsumi' Sapporo demo", Kokkaido Shimbun Evening Paper, Nov. 7, 1998.
"Shokuhin Hit Taisho Tokushu: Yushu Hit Sho Shiso Shochu Tantakatan (Goto Shusei)", Nippon Shokuryo Shinbun, Feb. 25, 2004, p. 23.
International Search Report dated Sep. 2, 2008 in International PCT Application PCT/JP2008/060826 filed Jun. 13, 2008.
European Search Report mailed Jun. 6, 2011 issued in EP Application No. 08777187.9.
"Fumi Suldciri 'Aojiso Shochu' Oita-Shi San Oba o Katyoyo," Asahi Shimbun Seibu Chihoban/Oita, Sep. 21, 2007, p. 26 (partial English-language translation).
"Sakura Shochu 'Sakura no Aya', Aojiso Shochu Shiso no Aya' Shinhatsubai-Gensen Tezumi no 'Wasozai' o Tsukatta, Shizen na Kaori to Ajiwai," Suntoary News Release No. 9887, Aug. 20, 2007, [retrieval date Jul. 9, 2008], internet (partial English-language translation).
"Mini File Sukkiri Aji no Shiso Shochu Takara Shuzo," Tokyo Shinbun Morning Paper, Aug. 23, 2006, p. 8 (partial English-language translation).
"Honkaku Shochu Tokushu: Honkaku Shochu Maker Doko = Takara Shuzo," Nippon Shokuryo Shinbun, May 1, 2006, p. 8 (partial English-language translation).
"[Uretemasu] Aojiso Inryo 'Shiso Bijun' Sherbet mo Osusume," Asahi Shimbun Seibu Chihoban/Miyazaki, May 12, 2006, p. 30 (partial English-language translation).
"Soft, Zangi, Chanmery . . . Shiso Shinshohin Hayakumo 5 Ken Chikaku Ramune mo Hatsubai Shiranuka," Hokkaido Shimbun Morning Paper Chiho, Feb. 11, 2007, p. 25 (partial English-language translation).
Ito et al., "Chemical Composition of the Essential Oil of Perlla frutescens," Natural Medicines, 1999, vol. 53, No. 1, pp. 32-36.
Supplementary European Search Report, and European Search Opinion issued in EP 08 77 7187, dated May 26, 2011.
International Preliminary Report on Patentability issued (dated Dec. 17, 2009) in PCT/JP2008/060826.

* cited by examiner

*Primary Examiner* — Vera Stulii
(74) *Attorney, Agent, or Firm* — Drinker Biddle & Reath LLP

(57) ABSTRACT

Provided are liquors or spirits that compensate for the oily and grass-like smell of perillaldehyde, the primary aroma component of *Perilla frutescens* var. *crispa* (shiso), to ensure that the fresh and natural fragrance of shiso is developed in a balanced way. In the process of making distilled liquors or spirits, the temperature of the distillation feed charged into a distillation vessel is managed appropriately, whereby the aroma components of shiso used as part of the feed can be recovered in a balanced way to produce distilled liquors or spirits having the fresh and natural fragrance of shiso. According to the distillation method of the present invention, no extra equipment investment is required and distilled liquors or spirits of good quality can be obtained with a minimum production cost.

3 Claims, No Drawings

DISTILLED LIQUORS AND SPIRITS HAVING THE FRESH AND NATURAL FRAGRANCE OF SHISO AND PROCESSES FOR PRODUCING THE SAME

CROSS REFERENCE TO RELATED APPLICATIONS

This application is a divisional of U.S. application Ser. No. 12/663,947 filed Dec. 10, 2009, which is the National Stage of International Application No. PCT/JP2008/060826 filed Jun. 13, 2008, which claims benefit of Japanese Patent Application No. 2007-156984, filed on Jun. 14, 2007, and which are incorporated by reference herein in their entirety.

TECHNICAL FIELD

The present invention relates to an enhancement and improvement of the flavor of distilled liquors and spirits that use shiso (*Perilla frutescens* var. *crispa*) as an ingredient. More particularly, the present invention relates to processes for producing distilled liquors and spirits with an enhanced and improved flavor that use shiso. The present invention further relates to alcoholic beverages that comprise the above-mentioned distilled liquors or spirits as well as water and/or other kinds of liquor or spirit.

BACKGROUND ART

Known plants of the Lamiaceae family consist of about 180 genera which in turn consist of about 3500 species and they are distributed in almost all areas of the world. Many of them contain essential oil components and give off fragrance and since ancient times, they have been used as valued plants in various parts of the world.

In Europe, plants of the Lamiaceae family are known as medicinal or perfume plants. Included among the plants of the Lamiaceae family are not only various species in the genus *Mentha* such as Japanese mint which contains menthol, *Mentha piperita* from which to make peppermint, and midori hakka which contains spearmint oil, but also lavender which is famous as perfume, rosemary from which to make rosemary oil, as well as edible flavors exemplified by sage, marjoram, savory, and thyme.

Shiso has also been used as medicine in China. In traditional Chinese medicine, leaves of *Perilla frutescens* var. *crispa f. purpurea* (red shiso) are typically called "soyoh" or "shisoyoh" and are formulated in hanghe-koh-boku-toh or kohso-san. Mature fruits of red shiso are called "soshi" and used in the treatment of cough, asthma, constipation, etc.

Shiso (*Perilla frutescens* var. *crispa*) which is widely cultivated in Japan is held native to the mid-southern part of China and was brought into Japan in old times. Shiso is not only used as medicament in the applications of traditional Chinese medicine; having a distinctive fragrance that can be recognized from the whole plant body and presenting bright colors that can be used in pigmentation, shiso also finds use in wider applications, e.g., as condiments, eaten fresh, or as pickles. For example, young buds of shiso (called murame if it is red shiso and aome if it is green shiso, or *Perilla frutescens* var. *crispa f. viridis*) are used as garnishing to be served with sashimi or as condiments; catkins of shiso (hojiso) are used as garnishing to be served with sashimi or eaten as tempura; leaves of green shiso (ohba) are used as condiments or as garnishing to be served with tempura or sashimi; leaves of red shiso are used for pigmentation of umeboshi (pickled plum) and other pickles. They are also frequently served in everyday meals as shiso furikake (ready-made, shiso-flavored toppings to go with white rice).

Thus, the refreshing scent and bright colors of shiso have long been relished by Japanese people and it may well be said that shiso is one of the most common and popular ingredients in food (Non-Patent Documents 1 and 2).

This preference of Japanese people for shiso is recently expanding to affect alcoholic beverages (Patent Document 1). In particular, "Tantakatan" (product of GODO SHUSEI CO., LTD.) and many other brands of shiso Shochu (shiso-flavored Japanese distilled spirit) are getting increasingly popular among consumers. Umeshu (plum wine) is also becoming a trend these days and among its commercial products are the one that is made by soaking not only plum but also shiso in Shochu.

The fragrance of shiso which is familiar to Japanese people originates from perillaldehyde, a kind of terpenes in its stem and leaves, and is said to account for 55% of the essential oils in shiso.

Patent Document 1: Official Gazette of JP 2005-143503 A

Non-Patent Document 1: HEIBONSHA'S WORLD ENCYCLOPEDIA

Non-Patent Document 2: TBS Britannica's Encyclopaedia Britannica

DISCLOSURE OF THE INVENTION

Problems to be Solved by the Invention

When perillaldeyde is subjected in its own to a sensory evaluation, a fragrance reminiscent of shiso is certainly recognizable but a somewhat oily and grass-like smell is also sensed. Hence, in an attempt to make distilled liquors or spirits using shiso, it is difficult to obtain the fresh and natural fragrance of shiso by simply increasing the content of the perillaldehyde component. Nevertheless, the prior art technology has focused on increasing the perillaldehyde content, thus failing to obtain distilled liquors or spirits that have the fresh and natural fragrance of shiso.

An object of the present invention is to provide distilled liquors or spirits of good quality having the fresh and natural fragrance of shiso.

Another object of the present invention is to provide processes for producing such distilled liquors or spirits.

Means for Solving the Problems

The present inventor made an intensive study with a view to solving the aforementioned problem and, as a result, he found that by adding not only perillaldehyde, the principal fragrance component of shiso, but also another specific aroma component selected from among limonene, cineol, linalool, benzaldehyde, α-pinene, and β-pinene, the aroma of distilled liquors or spirits that used shiso as an ingredient was markedly improved, whereupon the distilled liquor or spirit acquired the fresh and natural fragrance of shiso. The present inventor also set the amounts of the aroma components that should be contained in the distilled liquor or spirit in order to realize the above-mentioned quality. Further, the present inventor also found that the above-mentioned aroma components could be added to distilled liquors or spirits through appropriate temperature management of the distillation feed during distillation. These findings have led to the completion of the present invention.

The present invention provides the distilled liquors or spirits described below, as well as production methods for realizing them, and alcoholic beverages that contain the resulting distilled liquors or spirits.

1. A distilled liquor or spirit that is produced using *Perilla frutescens* var. *crispa*, which contains the following aroma components (A) and (B):
   (A) perillaldehyde; and
   (B) one or more aroma components selected from the group consisting of limonene, cineol, linalool, benzaldehyde, α-pinene, and β-pinene;
   wherein the total sum of the weights of components in group (B) is at least 4.0 mg in terms of pure alcohol per liter of the distilled liquor or spirit.

2. A distilled liquor or spirit that is produced using *Perilla frutescens* var. *crispa*, which contains the following aroma components (A) and (B):
   (A) perillaldehyde; and
   (B) one or more aroma components selected from the group consisting of limonene, cineol, linalool, benzaldehyde, α-pinene, and β-pinene;
   wherein the weight of component (A) is at least 2.5 mg and the total sum of the weights of components in group (B) is at least 4.0 mg, both values being in terms of pure alcohol per liter of the distilled liquor or spirit.

3. A distilled liquor or spirit that is produced using *Perilla frutescens* var. *crispa*, which contains the following aroma components (A) and (B):
   (A) perillaldehyde; and
   (B) one or more aroma components selected from the group consisting of limonene, cineol, linalool, benzaldehyde, α-pinene, and β-pinene;
   wherein the ratio of the total sum of the weights of components in group (B) to the weight of component (A) per liter of the distilled liquor or spirit is equal to or greater than 0 9, as expressed by (B)/(A)≥0.9, in terms of pure alcohol.

4. The distilled liquor or spirit according to any one of 1 to 3 above, wherein *Perilla frutescens* var. *crispa* is selected from between *Perilla frutescens* var. *crispa f. purpurea* and *Perilla frutescens* var. *crispa f. viridis*.

5. The distilled liquor or spirit according to any one of 1 to 3 above, wherein the *Perilla frutescens* var. *crispa* is one or more members selected from among:
   (1) leaves or stem of fresh *Perilla frutescens* var. *crispa;*
   (2) a dried, sheared, ground or enzymatically treated product of leaves or stem of fresh *Perilla frutescens* var. *crispa;* and
   (3) a liquid extract obtained by extracting (1) or (2) with water or an aqueous solution.

6. The distilled liquor or spirit according to any one of 1 to 3 above, which is Shochu.

7. A process for producing a distilled liquor or spirit comprising the steps of:
   charging a distillation vessel with an alcohol-containing distillation feed and *Perilla frutescens* var. *crispa;* and
   distilling the distillation feed under such conditions that
   (C) the temperature of the distillation feed at the time when the first fraction distills out; and
   (D) the temperature of the distillation feed at the end of distillation
   satisfy 50° C.≤(C)≤78° C. and 55° C.≤(D)≤90° C.

8. The process according to 7 above, wherein the *Perilla frutescens* var. *crispa* is one or more members selected from among:
   (1) leaves or stem of fresh *Perilla frutescens* var. *crispa;*
   (2) a dried, sheared, ground or enzymatically treated product of leaves or stem of fresh *Perilla frutescens* var. *crispa;* and
   (3) a liquid extract obtained by extracting (1) or (2) with water or an aqueous solution.

9. The process according to 8 above, wherein the *Perilla frutescens* var. *crispa* is leaves and/or stem of fresh *Perilla frutescens* var. *crispa*, and the following aroma components (A) and (B):
   (A) perillaldehyde; and
   (B) one or more aroma components selected from the group consisting of limonene, cineol, linalool, benzaldehyde, α-pinene, and β-pinene;
   are extracted in the distillation step, and wherein the total sum of the weights of components in group (B) is at least 4.0 mg in terms of pure alcohol per liter of the distilled liquor or spirit.

10. The process according to 7 above, wherein distillation is performed in the distillation step at a reduced pressure between 120 mmHg (ca. 16 kPa) and 350 mmHg (ca. 46.7 kPa).

11. The process according to 7 above, wherein the distilled liquor or spirit is Shochu.

12. An alcoholic beverage made by blending the distilled liquor or spirit according to any one of 1 to 3 above with water and/or another liquor or spirit.

13. The alcoholic beverage according to 12 above, which contains the following aroma components (A) and (B):
    (A) perillaldehyde; and
    (B) one or more aroma components selected from the group consisting of limonene, cineol, linalool, benzaldehyde, α-pinene, and β-pinene;
    wherein the total sum of the weights of components in group (B) is at least 2.5 mg in terms of pure alcohol per liter of the alcoholic beverage as packed in a container.

14. An alcoholic beverage obtained by soaking fruit in the distilled liquor or spirit according to any one of 1 to 3 above.

15. An alcoholic beverage obtained by soaking fruit in the alcoholic beverage according to 13 above.

Advantages of the Invention

In the process of making distilled liquors or spirits, the temperature of the alcohol-containing distillation feed charged into a distillation vessel is managed appropriately, whereby the aroma components of *Perilla frutescens* var. *crispa* charged together with the distillation feed can be recovered in a balanced way to produce a distilled liquor or spirit having the fresh and natural fragrance of *Perilla frutescens* var. *crispa*. The distilled liquor or spirit thus obtained may be blended with other liquors or spirits to produce novel alcoholic beverages having the fresh and natural fragrance of *Perilla frutescens* var. *crispa*.

In addition, according to the distillation method of the present invention, no extra equipment investment is required and distilled liquors or spirits of good quality can be obtained with a minimum production cost.

BEST MODE FOR CARRYING OUT THE INVENTION (Distilled Liquors or Spirits)

The term "distilled liquors or spirits" as used in the present invention refers to those liquors or spirits that are obtained by distilling an alcohol-containing distillation feed. In other words, distilled liquors or spirits are those liquors or spirits that are made by a process involving at least one distillation step. The distillation vessel to be used is preferably a pot still. Examples of the distilled liquors or spirits include Shochu, whiskey, vodka, gin, brandy, rum, tequila, etc. Other kinds of distilled liquors or spirits are course be encompassed.

(Alcohol-Containing Distillation Feed)

The alcohol-containing distillation feed to be used in the present invention refers to what contains alcohol and can be subjected to distillation to yield distilled liquors and spirits; whatever can be used as a feed for the production of liquors and spirits may be employed. For example, moromi (i.e., the product of alcoholic fermentation of a saccharide-containing material with a yeast) that is commonly used in the production of liquors and spirits may be employed. Exemplary saccharide-containing materials include grains such as rice and mugi (e.g., barley, rye, wheat, oat, and naked barley), soba (buckwheat), corn, awa (foxtail millet), kibi (millet), and hie (Japanese millet); potatoes such as sweet potato, white potato, satoimo, kikuimo, yamanoimo, nagaimo, and jinenjyo; vegetables such as pumpkin, tomato, and carrot; fruits such as grape, apple, and date (date palm); and molasses. In addition, aside from the products of fermentation of those saccharide-containing materials, saccharide-free plant materials such as grass roots and barks may be soaked in aqueous alcoholic solutions and used as a liquid distillation feed.

(*Perilla frutescens* var. *crispa*)

In the present invention, distillation is performed using shiso, or *Perilla frutescens* var. *crispa*, together with the alcohol-containing distillation feed. The *Perilla frutescens* var. *crispa* that can be used in the present invention may be either *Perilla frutescens* var. *crispa f. purpurea* or *Perilla frutescens* var. *crispa f. viridis* or both. When both types are used, their weight ratio is not particularly limited and may be chosen as appropriate for the required product quality. It should be noted here that *Perilla frutescens* var. *crispa f. viridis* may include what is called ohba in Japan.

The *Perilla frutescens* var. *crispa* to be used in the present invention together with the distillation feed may be either fresh leaves or stem or both, which may be used either as such or after being cut to suitable sizes; alternatively, they may be processed before distillation. The processing may be exemplified by drying, shearing, grinding or enzymatic treatment of the leaves or stem of fresh *Perilla frutescens* var. *crispa*. The enzymatic treatment refers to a treatment for collapsing plant tissues by means of an enzyme. The enzyme to be used in the enzymatic treatment is not particularly limited as long as it can collapse plant tissues; for example, cellulase, hemicellulase, xylanase, pectinase, protopectinase and the like may be employed; the processing conditions may be such that they are optimal for the individual enzymes used or they may be determined as appropriate for the required product quality. In addition, the *Perilla frutescens* var. *crispa* to be used in the present invention together with the distillation feed may be in the form of a liquid extract as obtained by extracting fresh or processed *Perilla frutescens* var. *crispa* with water or an aqueous solution (e.g., aqueous alcoholic solution).

The amount of *Perilla frutescens* var. *crispa* to be used may be of any value that imparts the intended aroma to the distilled liquor or spirit of the present invention. The appropriate amount of shiso (*Perilla frutescens* var. *crispa*) to be used varies with the desired product quality and the type of the distilled liquor or spirit to be produced. Shiso has an extremely great latitude for the amount to be used and the appropriate amount can be determined from such a viewpoint as practically feasible production efficiency. The appropriate amount of shiso to be used may be exemplified as follows: in the case of producing Shochu, it may be used as fresh leaves or stem in 10 to 80 parts by weight, preferably 15 to 50 parts by weight, per 100 parts by weight of the alcohol in the distillation feed just before the start of distillation; in the case of producing distilled liquors or spirits other than Shochu, shiso may be used as fresh leaves or stem in at least 4 parts by weight per 100 parts by weight of the alcohol in the distillation feed just before the start of distillation. It should be noted here that the weight of the fresh leaves or stem of shiso as mentioned above refers to the weight of the fresh leaves or stem of shiso at the point in time when it has been added.

The timing on which shiso is added to the distillation feed in the process of production is not limited as long as it is added before the start of distillation. For example, in the case where the distillation feed to be used in the present invention is moromi, or the product of alcoholic fermentation of a saccharide-containing material, shiso may be added to the yet to be fermented sacharide-containing material and then subjected to fermentation, or alternatively, shiso may be added to the distillation feed just before the start of distillation. In the case of producing shiso-flavored Shochu, a koji-containing material obtained by fermentation with yeast may be mixed with a secondary feed to make so-called secondary moromi, to which shiso is then added. (koji: a kind of yeast prepared from rice, grain or sweet potate)

(Shochu)

Shochu as herein referred to complies with the definition of "Pot stilled Shochu" stated in the Japanese Liquor Tax Act, Section 3, Subsection 10. In short, while various types of liquors and spirits are obtained by distillation with a pot still, Shochu makes a class of distilled liquors or spirits that have an alcohol content of no more than 45% and which are not classified as whiskey, brandy, vodka, rum, gin or the like. The starting material from which to make Shochu in the present invention is not particularly limited as long as it is of a conventional type but it is preferred to use those that match the fresh and natural fragrance of shiso. It is particularly preferred to use rice since its rich, soft scent matches the refreshing fragrance of shiso. The same is true with the starting material from which to make koji for use in Shochu as herein referred to. The amount of koji to be used in the present invention is not particularly limited as long as it is within a range that will not prevent the present invention from exhibiting its intended effect.

(Distillation Conditions)

To obtain distilled liquors or spirits that have the fresh and natural fragrance of shiso, it is essential that the following distillation conditions be satisfied.

The distillation conditions are determined in such a way that the distilled liquor or spirit that is obtained contains the following aroma components (A) and (B):

(A) perillaldehyde; and (B) one or more aroma components selected from the group consisting of limonene, cineol, linalool, benzaldehyde, α-pinene, and β-pinene.

If the distilled liquor or spirit contains component (A) and if the total content of components in group (B) is at least 4.0 mg in terms of pure alcohol per liter of it, it can be provided with the fresh and natural fragrance of shiso. The total content of components in group (B), as calculated for pure alcohol, is preferably at least 10 mg, more preferably at least 20 mg, and even more preferably at least 35 mg from the viewpoint of assuring more enhanced freshness. In addition, the content of component (A), as calculated for pure alcohol, is preferably at least 2.5 mg, more preferably at least 5.0 mg, even more preferably at least 7.5 mg, and most preferably at least 15 mg from the viewpoint of further intensifying the fragrance of shiso. If component (A) is present in an amount of at least 2.5 mg and if the total sum of the weights of components in group (B) which is at least 4.0 mg, the fragrance and freshness of shiso are sensed in a balanced way to provide a preferred result. Further in addition, the content of component (A) and the total sum of components (B) are preferably at least 5.0 mg and 10 mg, respectively, and more preferably at least 15 mg and 20 mg, respectively, since this enables the fresh and natural fragrance of shiso to be sensed intensely.

If the total content of components (B) is sufficiently higher than the content of component (A), the somewhat oily grass-like smell of perillaldehyde as component (A) is masked to improve the aroma of distilled liquor or spirits, which is a preferred result. Stated more specifically, if the ratio of the total sum of the weights of components in group (B) to the weight of component (A) present (in terms of pure alcohol) is equal to or greater than 0.9 (i.e., ((B)/(A) is equal to or greater than 0.9), the aroma of distilled liquors or spirits is greatly improved, which is also a preferred result.

Distilled liquors or spirits having these contents of aroma components can be obtained by the appropriate temperature management of the distillation feed during distillation. The applicable temperature conditions are as follows.

Such distillation conditions that the distillation feed charged into the distillation vessel satisfies 50° C.≤(C)≤78° C. and 55° C.≤(D)≤90° C., where (C) is the temperature of the distillation feed at the time when the first fraction distills out and (D) is the temperature of the distillation feed at the end of distillation.

In the present invention, if the distillation temperature is below the specified lower limit, it is difficult to ensure that the aroma of shiso is fully developed. On the other hand, if the distillation temperature is higher than the specified upper limit, an odor develops that smells like something that has boiled down and is burning or an oily aroma develops, only to yield a distilled liquor or spirit that lacks a fresh, shiso-like fragrance. The above-indicated temperature conditions more preferably satisfy 50° C.≤(C)≤72° C. and 58° C.≤(D) ≤82° C. since the fresh and natural fragrance of shiso is intensified. Even more preferably, 60° C.≤(C)≤72° C. and 70° C.≤(D)≤82° C. are satisfied since the fragrance of shiso is further intensified. In addition, difference between (D) and (C) is preferably 10° C. or more since a more intense fragrance develops. For distillation, the distillation feed that has lapsed for a specified period of time after the addition of shiso is preferably supplied with heat to establish the temperature conditions set forth above.

Any method may be employed to establish the temperature conditions (C) and (D) set forth above. For example, the degree of vacuum is varied depending upon the percentage of alcohol in the distillation feed which is to be subjected to distillation and at the thus specified degree of vacuum, the distillation feed is heated to perform distillation, whereby the temperature conditions (C) and (D) set forth above are established. Temperature control by this management of vacuum conditions is preferred since it is the simplest way and involves no need for equipment with new facilities and revamping, which is advantageous from the viewpoint of production cost in the absence of the need for capital investment. Any method may be employed to supply the heat source for distillation but indirect heating is preferred since it is free from the development of any malodor such as one that smells like a burning object.

Controlling the distillation temperature for the production of Shochu by management of the vacuum conditions described above is explained below with reference to an example. In the ordinary reduced pressure distillation for the production of Shochu, the interior of the distillation vessel is held at a pressure of from about 60 mmHg (ca. 8 kPa) to about 100 mmHg (ca. 13.3 kPa) and distillation is performed in such a way that it ends when the temperature of moromi has reached about 50° C. However, if moromi with an alcohol content of about 17% is heated as the interior of the distillation vessel is held at a pressure of about 200 mmHg (ca. 26.7 kPa), the initial fraction of distillate starts to distill off at a moromi temperature of about 50° C. and distillation can be brought to an end at a moromi temperature of about 63-64° C. Thus, distillation can be performed at higher temperatures than in the ordinary reduced pressure distillation. As a result, the fresh and natural fragrance of shiso can be developed. It should, however, be stressed that management of the degree of vacuum is just one way to manage the temperature of moromi.

For reference sake, the relation between the degree of vacuum in the distillation step and the temperature (measured or theoretical) of moromi (with ca. 17% alcohol) is shown in the following Table 1.

TABLE 1

| | Degree of vacuum (mmHg) | Residue temperature (° C.) | |
|---|---|---|---|
| | | Start of distillation | End of distillation |
| Normal pressure distillation | 760 | 80 | 100 |
| Reduced pressure distillation | 60 | 37 | 43.5 |
| Slightly-reduced-pressure distillation | 150 | 50 | 61 |
| | 200 | 56 | 66 |
| | 250 | 62 | 72 |
| | 300 | 66 | 76 |

(In the above table, the residue temperature indicated for normal pressure distillation at 760 mg, distillation at 60 mmHg, and slightly-reduced-pressure distillation at 150 mmHg is expressed by measured values whereas the residue temperature indicated for slightly-reduced-pressure distillation at 200, 250 and 300 mmHg is expressed by theoretical values.)

(Alcoholic Beverages)

The distilled liquors or spirits to be obtained in the present invention may be blended with water and/or other liquors or spirits to make alcoholic beverages. If desired, saccharides, acidulants, flavors, etc. may be added.

The other liquors or spirits that may be blended with the distilled liquors or spirits in the present invention are not limited at all in terms of type and the amount in which they can be incorporated, on the condition that they will not be deleterious to the intended effects of the present invention; preferred examples are those liquors or spirits which do not have too strong individuality but have a soft flavor, as illustrated by Shochu made from molasses or corn by the continuous distillation process, alcohol as a starting material, vodka, aquavit, or wheat-, barley- or rice-based Shochu that does not have too strong individuality.

The alcoholic beverages that comprise the distilled liquors or spirits of the present invention as blended with water or other liquors or spirits may contain the aforementioned aroma component (B), namely, one or more aroma components selected from the group consisting of limonene, cineol, linalool, benzaldehyde, α-pinene, and β-pinene, in an amount of at least 2.5 mg (as the total of components in group (B)) in terms of pure alcohol per liter of the alcoholic beverage as packed in a container, and this is preferred since the resulting beverages allow the consumer to sense the distinct feature of fresh shiso. More preferably, the sum of the weights of components in group (B) is at least 4.0 mg in terms of pure alcohol per liter of the alcoholic beverage as packed in a container since the fragrance of fresh shiso is intensified. Even more preferably, the sum of the weights of components in group (B) is at least 5.4 mg since the fragrance of shiso is further intensified.

The distilled liquors or spirits obtained in the present invention have a fresh and refreshing fragrance, so fruits may be soaked in them and used as a starting material from which to make fruit wine. The types of fruit that can be soaked in the distilled liquors or spirits of the present invention are not particularly limited and preferred examples include: pome fruits (e.g. Chinese quince, apple, and Japanese pear); stone fruits (e.g., Japanese plum, apricot, peach, plum, and cherry); citrus fruits (e.g., mandarin orange, *Citrus iyo*, kumquat, summer orange, *Citrus tankan* Hayata, *Citrus hassaku, Citrus reticulata*, orange, *Citrus sphaerocarpa*, bitter orange, grapefruit, *Citrus depressa, Citrus sudachi, Citrus junos*, lemon, and lime); and tropical fruit trees (acerola, pineapple, banana, guava, date palm, papaya, and mango); and other fruits (e.g. loquat, fig, persimmon, pomegranate, jujube, strawberry, kiwi, melon, bayberry, cowberry or lingonberry, black currant, blueberry, raspberry, cranberry, and blackberry).

Fruit juice may also be incorporated in the alcoholic beverages of the present invention. The applicable fruit juice may be of either a straight type that is obtained by simply crushing and pressing fruit itself or of a concentrated type that is obtained by concentrating the straight juice. When the concentrated fruit juice is used, the turbidity components or sparingly soluble components that originate from the fruit may be insolubilized, causing problems such as precipitation or thickening; to prevent them, it is preferred to use fruit juice that has been clarified totally (clear juice) or partially (half-clear juice). Various clarification methods are known, such as precision filtration, enzymatic treatment, and ultrafiltration, and any of these methods may be employed for clarification purposes. Concentrated fruit juice may, depending on the case, have its sugar content adjusted with saccharides, honeybee or the like; alternatively, its acidity may be adjusted. In addition to the clear fruit, turbid juice may also be used, as exemplified by whole fruit juice that is obtained by crushing the whole fruit including the rind and then selectively removing particularly coarse and rigid solids such as seeds, or fruit purée obtained by straining the fruit, or juice obtained by crushing or extracting the flesh of dry fruit. The fruit juice to be contained in the alcoholic beverages of the present invention is not particularly limited in terms of its type and amount as long as they are within the ranges that are normally used. Only one type of fruit juice may be used independently or, alternatively, two or more types may be used in combination. In addition, the amount of the fruit juice that can be incorporated in the alcoholic beverages of the present invention is not particularly limited as long as it is within a range that is not deleterious to the intended effects of the present invention.

To make the fresh fragrance of shiso more distinct, carbon dioxide may also be contained in the alcoholic beverages of the present invention. In addition, to maintain the fresh and natural fragrance of shiso that is characteristic of the present invention and to improve the top note that is first sensed, the alcoholic beverages of the present invention are preferably packed in containers. The type of container in which the alcoholic beverages are to be served is not limited at all and conventional types may be used, as exemplified by plastics-based molded containers, metal cans, laminated paper containers in which the paper is laminated with metal foil or plastic film, and glass bottles.

EXAMPLES

The present invention will be described more specifically by the following examples but it should be understood that the present invention is by no means limited to those examples.

Example 1

Production of Shiso-Flavored Shochu (1)

(Brewing of Moromi for Shiso-Flavored Shochu)
Brewing was performed with the formulation indicated in Table 2 below.

TABLE 2

Brewing Formulation (1)

| Ingredient | Primary brewing | Secondary brewing | Total |
| --- | --- | --- | --- |
| Dry koji rice (g) | 2400 | 0 | 2400 |
| Pregelatinized rice (g) | 0 | 4800 | 4800 |
| Ohba (g) | 0 | 520 | 520 |
| Water (mL) | 3000 | 9000 | 12000 |

The dry koji rice (white) and the pregelatinized rice were each purchased from HDA TRADING CO., LTD. The yeast was Kyokai No. 2 (purchased from the Brewing Society of Japan). Kyokai No. 2 was reconstituted with water as prescribed and added such that the number of viable cells in primary moromi would be ca. $5 \times 10^5$/mL.

Commercially available green shiso (ohba) was used. It was well washed with water, cut into eight pieces, and charged into secondary moromi.

The primary moromi was fermented in a thermostatic chamber (28° C.) for six days and the secondary moromi was fermented in the same thermostatic chamber for 12-13 days. The thus generated moromi for shiso-flavored Shochu had a volume of 18.66 L with an alcohol content of 17.1%.

(Distillation)
A 5-L capacity stainless steel pot still was charged with 3200 mL of the moromi and reduced pressure distillation was performed (only the sample distilled at 120 mmHg was charged in an amount of 2460 mL). Heating was performed in a thermostatic water tank. The degree of vacuum was adjusted at six levels, 60, 80, 100, 120, 150, and 200 mmHg. The distillation was ended at the point in time when the unprocessed shiso-flavored Shochu to be obtained was estimated to have an alcohol content of ca. 40-45%. The temperature of the moromi was measured both at the time when the first fraction distilled out and at the time when the distillation ended; the volume of the unprocessed shiso-flavored Shochu and its alcohol content were also measured.

(Measurement of Alcohol Content)
Measurement was performed with an oscillation-type density meter (product of Kyoto Electronics Manufacturing Co., Ltd.) Unless otherwise noted, the alcohol content herein referred to is expressed by volume percent.

(Analysis of Aroma Components by Gas Chromatography (GC))
The unprocessed Shochu as obtained by distillation was analyzed for any peryllaldehyde, benzaldehyde and terpenes present by means of a GC analyzing system (HP6890 manufactured by HP). The conditions for analysis were as follows:

The temperature in the oven was first held at 45° C. for one minute, then raised to 230° C. at a rate of 5° C. per minute, and held at that temperature for five minutes. The inlet temperature and the split ratio were adjusted at 250° C. and 15:1, respectively. The column was Ultra2 5% Phenyl Methyl Siloxane (product of Agilent; i.d. 0.32 mm; column length, 50 m), and helium was allowed to flow as a carrier gas at a rate of 3.2 mL/min. Using FID (hydrogen flame ionization detector), detection was conducted at 260° C. Each of the amounts of the aroma components (mg/L) as obtained by the analysis was divided by the alcohol content of the unprocessed Shochu and expressed as the amount of that component per 100% alcohol (referred to as the value in terms of pure alcohol (mg/L)).

The results of GC analysis are shown in Table 3, which also shows the results of GC analysis on three comparative samples (P, Q, and R) produced by competitors of the Applicant. Perillaldehyde is labeled (A) and other terpenes and benzaldehyde are labeled (B). The total sum of the amounts of the components in class (B) is also shown in Table 3.

From shiso-flavored Shochu sample Nos. 1 to 3 prepared by distillation with the degree of vacuum adjusted at 60, 80 and 100 mmHg, respectively, limonene and cineol were detected but perillaldehyde was not. From sample Nos. 4 to 6 prepared by distillation at 120, 150 and 200 mmHg, respectively, not only perillaldehyde but also limonene and cineol as terpenes were detected. From the competitor's sample P, perillaldehyde was detected but no terpenes were detected. From the competitor's samples Q and R, not only perillaldehyde but also limonene, cineol, linalool and benzaldehyde were detected; however, in these two comparative samples, the components in class (B) were present in much smaller amounts than perillaldehyde and the quantitative ratio of (B) to (A) was approximately 0.088 and 0.19, respectively.

(Sensory Evaluation)

The six samples of unprocessed shiso-flavored Shochu that were produced by distillation at different degrees of vacuum as described above were thinned with pure water to an alcohol content of 20% and then subjected to sensory evaluation by a panel of six experienced judges. For comparison, the three competitors' samples P, Q and R were also thinned with pure water to an alcohol content of 20% and then subjected to sensory evaluation. The results of the two sensory evaluations, the degrees of vacuum employed to prepare sample Nos. 1 to 6 by distillation, the amount charged (i.e., the amounts in which they were charged into the distillation vessel), the temperatures of moromi, the volumes of the unprocessed samples as obtained by distillation, their alcohol contents, the amount of component (A), the amounts of components in class (B), and the values of (B)/(A) are shown in Table 4. The "start" column associated with the temperature of moromi indicates the temperature of moromi at the time when the first fraction of distillate started to distill off whereas the "end" column indicates the temperature of moromi at the time when distillation ended.

No characteristic scent of shiso was sensed from sample Nos. 1 to 3 that were obtained by distillation at degrees of vacuum not more than 100 mmHg. This was probably because perillaldehyde (A) was not detected. The fresh and natural fragrance of shiso was recognized in sample Nos. 4 and 5 which were obtained by distillation at 120 mmHg and 150 mmHg. The fresh and natural fragrance of shiso was sensed more intensely from sample No. 6 that was obtained by distillation at 200 mmHg. The sample Nos. 4 to 6 had a light and refreshing scent, giving the impression that the somewhat oily, grass-like scent of perillaldehyde was masked. In contrast, the competitor's sample P, although it smelled like shiso, was short of its fresh fragrance. It was further pointed out that from Q and R, a somewhat oily, grass-like smell which was the undesirable scent of perillaldehyde was sensed slightly but that there was sensed no fresh and natural fragrance that was characteristic of the samples of the present invention.

TABLE 3

Amounts of Aroma Components Measured by GC Analysis (1)

| | Sample | | | | | | | | |
|---|---|---|---|---|---|---|---|---|---|
| | 1 | 2 | 3 | 4 | 5 | 6 | P | Q | R |
| Degree of vacuum (mmHg) | 60 | 80 | 100 | 120 | 150 | 200 | — | — | — |
| Alcohol content (%) | 41.1 | 40.8 | 41.4 | 41.4 | 42.5 | 42.5 | 20.2 | 20.1 | 25.3 |
| Value in terms of pure alcohol (mg/L) | | | | | | | | | |
| (A) perillaldehyde | 0.0 | 0.0 | 0.0 | 5.0 | 15.2 | 24.7 | 6.8 | 9.1 | 18.7 |
| total | 0.0 | 0.0 | 0.0 | 5.0 | 15.2 | 24.7 | 6.8 | 9.1 | 18.7 |
| (B) limonene | 6.3 | 6.6 | 10.6 | 12.1 | 15.3 | 19.0 | 0 | trace | 0.6 |
| cineol | 2.4 | 0.0 | 0.0 | 0.0 | 3.3 | 3.7 | 0 | trace | trace |
| linalool | 0.0 | 0.0 | 0.0 | 0.0 | 0.0 | 0.0 | 0 | 0.4 | 1.2 |
| benzaldehyde | 0.0 | 0.0 | 0.0 | 0.0 | 0.0 | 0.0 | 0 | 0.4 | 1.8 |
| α-pinene | 0.0 | 0.0 | 0.0 | 0.0 | 0.0 | 0.0 | 0 | 0 | 0 |
| β-pinene | 0.0 | 0.0 | 0.0 | 0.0 | 0.0 | 0.0 | 0 | 0 | 0 |
| total | 8.7 | 6.6 | 10.6 | 12.1 | 18.6 | 22.7 | 0 | 0.8 | 3.6 |
| (B)/(A) | — | — | — | 2.40 | 1.22 | 0.92 | 0 | 0.088 | 0.19 |

TABLE 4

Profile of Distillation for the Production of Shiso-flavored Shochu and Results of Sensory Evaluation (1)

| Sample No. | Distillation Degree of vacuum (mmHg) | Amount charged (mL) | Temperature of moromi (° C.) Start | Temperature of moromi (° C.) End | Unprocessed Shochu Volume (mL) | ALC content (%) | Aroma Quality | component (mg/L) (A) | (B) | (B)/(A) |
|---|---|---|---|---|---|---|---|---|---|---|
| 1 | 60 | 3200 | 35.0 | 44.5 | 1170 | 41.8 | No scent of | 0.0 | 8.7 | — |
| 2 | 80 | 3200 | 42.5 | 51.0 | 1190 | 41.2 | shiso was | 0.0 | 6.6 | — |
| 3 | 100 | 3200 | 47.0 | 55.5 | 1190 | 41.8 | sensed. | 0.0 | 10.6 | — |
| 4 | 120 | 2460 | 51.0 | 59.0 | 900 | 41.7 | Fresh and | 5.0 | 12.1 | 2.40 |
| 5 | 150 | 3200 | 55.0 | 64.0 | 1180 | 42.9 | natural fragrance of shiso was sensed. | 15.2 | 18.6 | 1.22 |
| 6 | 200 | 3200 | 61.0 | 71.0 | 1200 | 42.9 | Fresh and natural fragrance of shiso was intensified. | 24.7 | 22.7 | 0.92 |
| P | — | — | — | — | — | 20.2 | Smelled like shiso but lacked freshness. | 6.8 | 0.0 | 0 |
| Q | — | — | — | — | — | 20.1 | Smelled like shiso but a grass-like scent was slightly recognized. | 9.1 | 0.8 | 0.088 |
| R | — | — | — | — | — | 25.3 | Smelled like shiso but a somewhat oily, grass-like scent was also recognized. | 18.7 | 3.6 | 0.19 |

Example 2

Production of Shiso-Flavored Shochu (2)

(Brewing of Moromi for Shiso-Flavored Shochu)

Brewing was performed as in Example 1. The resulting moromi for shiso-flavored Shochu had a volume of 18.36 L with an alcohol content of 15.2%.

(Distillation)

A 5-L capacity stainless steel pot still was charged with 3000 mL of the moromi and reduced pressure distillation was performed. Heating was performed with a mantle heater. The degree of vacuum was adjusted at five levels, 150, 200, 250, 300 and 350 mmHg. The distillation was ended at the point in time when the unprocessed shiso-flavored Shochu to be obtained was estimated to have an alcohol content of ca. 40-45%. The temperature of the moromi was measured both at the time when the first fraction distilled out and at the time when the distillation ended; the volume of the unprocessed shiso-flavored Shochu and its alcohol content were measured as in Example 1.

(Analysis of Aroma Components by Gas Chromatography (GC))

The unprocessed shiso-flavored Shochu thus obtained was analyzed by GC and the results are shown in Table 5, which also shows the results of GC analysis on three comparative samples (P, Q, and R) produced by competitors of the Applicant. Perillaldehyde is labeled (A) and other terpenes including benzaldehyde are labeled (B). The total sum of the amounts of the components in class (B) is also shown in Table 5.

From shiso-flavored Shochu sample Nos. 7 to 11 prepared by distillation with the degree of vacuum adjusted at 150, 200, 250, 300 and 350 mmHg, respectively, not only perillaldehyde but also limonene, cineol and linalool as terpenes were detected together with benzaldehyde. From the competitor's sample P, perillaldehyde was detected but no terpenes were detected. From the competitor's samples Q and R, not only perillaldehyde but also limonene, cineol, linalool and benzaldehyde were detected; however, in these two comparative samples, the components in class (B) were present in much smaller amounts than perillaldehyde and the quantitative ratio of (B) to (A) was approximately 0.088 and 0.19, respectively.

TABLE 5

Amounts of Aroma Components Measured by GC Analysis (2)

| | Sample | | | | | | | |
|---|---|---|---|---|---|---|---|---|
| | 7 | 8 | 9 | 10 | 11 | P | Q | R |
| Degree of vacuum (mmHg) | 150 | 200 | 250 | 300 | 350 | — | — | — |
| Alcohol content (%) | 43.0 | 42.8 | 44.2 | 44.3 | 42.5 | 20.2 | 20.1 | 25.3 |

TABLE 5-continued

Amounts of Aroma Components Measured by GC Analysis (2)

| | Sample | | | | | | | |
|---|---|---|---|---|---|---|---|---|
| | 7 | 8 | 9 | 10 | 11 | P | Q | R |
| | Value in terms of pure alcohol (mg/L) | | | | | | | |
| (A) perillaldehyde | 19.5 | 25.6 | 17.8 | 18.7 | 19.3 | 6.8 | 9.1 | 18.7 |
| total | 19.5 | 25.6 | 17.8 | 18.7 | 19.3 | 6.8 | 9.1 | 18.7 |
| (B) limonene | 33.4 | 32.9 | 52.7 | 45.3 | 29.3 | 0 | trace | 0.6 |
| cineol | 2.9 | 3.8 | 3.3 | 3.4 | 3.9 | 0 | trace | trace |
| linalool | 3.4 | 2.9 | 3.4 | 3.1 | 3.3 | 0 | 0.4 | 1.2 |
| benzaldehyde | 0.0 | 0.0 | 0.0 | 0.0 | 2.6 | 0 | 0.4 | 1.8 |
| α-pinene | 0.0 | 0.0 | 0.0 | 0.0 | 0.0 | 0 | 0 | 0 |
| β-pinene | 0.0 | 0.0 | 0.0 | 0.0 | 0.0 | 0 | 0 | 0 |
| total | 39.7 | 39.7 | 59.4 | 51.8 | 39.1 | 0 | 0.8 | 3.6 |
| (B)/(A) | 2.04 | 1.55 | 3.35 | 2.76 | 2.02 | 0 | 0.088 | 0.19 |

(Sensory Evaluation)

The five samples of unprocessed shiso-flavored Shochu that were produced by distillation at different degrees of vacuum as described above were thinned with pure water to an alcohol content of 20% and then subjected to sensory evaluation by a panel of six experienced judges. For comparison, the three competitors' samples P, Q and R were also subjected to sensory evaluation. The results of the two sensory evaluations, the degrees of vacuum employed to prepare sample Nos. 7 to 11 by distillation, the amount charged (i.e., the amounts in which they were charged into the distillation vessel), the temperatures of moromi, the volumes of the unprocessed samples as obtained by distillation, their alcohol contents, the amount of component (A), the amounts of components in class (B), and the values of (B)/(A) are shown in Table 6. The "start" column associated with the temperature of moromi indicates the temperature of moromi at the time when the first fraction of distillate started to distill off whereas the "end" column indicates the temperature of moromi at the time when distillation ended.

As it turned out, the fresh and natural fragrance of shiso was recognized in sample No. 7 that was obtained by distillation at 150 mmHg, and the fresh and natural fragrance of shiso was sensed more intensely from sample No. 8 that was obtained by distillation at 200 mmHg. The fresh and natural fragrance of shiso was sensed intensely enough in sample Nos. 9 to 11 that were obtained by distillation at 250, 300 and 350 mmHg, giving the impression that the intensity of their scent was almost comparable to that of sample No. 8 that was obtained by distillation at 200 mmHg. The sample Nos. 7 to 11 had a light and refreshing scent, giving the impression that the somewhat oily, grass-like scent of perillaldehyde was masked. In contrast, the competitor's sample P, although it smelled like shiso, was short of its fresh fragrance. It was further pointed out that from Q and R, a somewhat oily, grass-like smell which was the undesirable scent of perillaldehyde was sensed slightly but that there was sensed no fresh and natural fragrance that was characteristic of the samples of the present invention.

TABLE 6

Profile of Distillation for the Production of Shiso-flavored Shochu and Results of Sensory Evaluation (2)

| Sample | Distillation | | | | Unprocessed Shochu | | | Aroma component (mg/L) | | |
|---|---|---|---|---|---|---|---|---|---|---|
| No. | Degree of vacuum (mmHg) | Amount charged (mL) | Temperature of moromi (° C.) Start | End | Volume (mL) | ALC content (%) | Quality | (A) | (B) | (B)/(A) |
| 7 | 150 | 3000 | 53.0 | 61.0 | 1000 | 43.0 | Fresh and natural fragrance of shiso was sensed. | 19.5 | 39.7 | 2.04 |
| 8 | 200 | 3000 | 59.5 | 68.0 | 1010 | 42.8 | Fresh and natural fragrance of shiso was intensified. | 25.6 | 39.7 | 1.55 |
| 9 | 250 | 3000 | 64.0 | 73.0 | 1000 | 44.2 | Fresh and natural fragrance of shiso was sensed intensely, giving the impression that the intensity of their scent was almost comparable to the 200 mmHg sample. | 17.8 | 59.4 | 3.35 |
| 10 | 300 | 3000 | 66.5 | 76.0 | 1000 | 44.3 | | 18.7 | 51.8 | 2.76 |
| 11 | 350 | 3000 | 71.5 | 81.0 | 1020 | 42.5 | | 19.3 | 39.1 | 2.02 |
| P | — | — | — | — | — | 20.2 | Smelled like shiso but lacked freshness. | 6.8 | 0.0 | 0 |

TABLE 6-continued

Profile of Distillation for the Production of Shiso-flavored Shochu and Results of Sensory Evaluation (2)

| Sample | Distillation | | | | Unprocessed Shochu | | | | |
|---|---|---|---|---|---|---|---|---|---|
| | | Temperature | | | | | Aroma component (mg/L) | | |
| | Degree of vacuum | Amount charged | of moromi (° C.) | | Volume | ALC content | | | |
| No. | (mmHg) | (mL) | Start | End | (mL) | (%) | Quality | (A) | (B) | (B)/(A) |
| Q | — | — | — | — | — | 20.1 | Smelled like shiso but a grass-like scent was slightly recognized. | 9.1 | 0.8 | 0.088 |
| R | — | — | — | — | — | 25.3 | Smelled like shiso but a somewhat oily, grass-like scent was also recognized. | 18.7 | 3.6 | 0.19 |

Example 3

Alcoholic Beverage Containing Shiso-Flavored Shochu (Brewing of Moromi for Shiso-Flavored Shochu)
Brewing was performed with the formulation indicated in Table 7 below.

TABLE 7

Brewing Formulation (2)

| Ingredient | Primary brewing | Secondary brewing | Total |
|---|---|---|---|
| Dry koji rice (g) | 600 | 0 | 600 |
| Pregelatinized rice (g) | 0 | 1200 | 1200 |
| Ohba (g) | 0 | 140 | 140 |
| Water (mL) | 730 | 2300 | 3030 |

The dry koji rice (white) and the pregelatinized rice were each purchased from IIDA TRADING CO., LTD. The yeast was Kyokai No. 2 (purchased from the Brewing Society of Japan). Kyokai No. 2 was reconstituted with water as prescribed and added such that the number of viable cells in primary moromi would be ca. $5 \times 10^5$/mL.

Commercially available green shiso (ohba) was used. It was well washed with water, cut into eight pieces, and immediately charged into secondary moromi.

The primary moromi was fermented at ca. 21-23° C. for two days and the secondary moromi was fermented for nine days (the temperature of moromi: ca. 21-23° C.). The thus generated moromi for shiso-flavored Shochu had a volume of 4.9 L with an alcohol content of 16.0%.

(Distillation)
A 5-L capacity stainless steel pot still was charged with 4900 mL of the moromi and reduced pressure distillation was performed. Heating was performed with a mantle heater. The degree of vacuum was adjusted at 180 mmHg. The distillation was ended at the point in time when the unprocessed shiso-flavored Shochu to be obtained was estimated to have an alcohol content of ca. 40-45%. The resulting unprocessed shiso-flavored Shochu had a volume of 1760 mL with an alcohol content of 42.6%.

(Analysis of Aroma Components by GC)
The unprocessed shiso-flavored Shochu thus obtained was analyzed by GC and the result is shown in Table 8. Perillaldehyde is labeled (A) and other terpenes and benzaldehyde are labeled (B). The total sum of the amounts of the components in class (B) is also shown in Table 8.

TABLE 8

Amounts of Aroma Components Measured by GC Analysis (3)

| | Sample 12 |
|---|---|
| Degree of vacuum (mmHg) | 180 |
| Alcohol content (%) | 42.6 |
| Value in terms of pure alcohol (mg/L) | |
| (A) perillaldehyde | 4.5 |
| Total | 4.5 |
| (B) limonene | 6.3 |
| cineol | 0.4 |
| linalool | 6.6 |
| benzaldehyde | 0.0 |
| α-pinene | 0.0 |
| β-pinene | 0.4 |
| Total | 13.6 |
| (B)/(A) | 3.02 |

The thus obtained unprocessed shiso-flavored Shochu (sample No. 12) was blended with other liquor or spirit, then thinned with pure water to adjust the alcohol content to 20%, yielding alcoholic beverage sample Nos. 13 to 24, which were each subjected to a sensory evaluation. Sample Nos. 13 to 18 were prepared by blending with the alcohol made from molasses through continuous distillation, such that the content of the unprocessed shiso-flavored Shochu in the alcoholic beverage would be 10, 15, 20, 30, 40 and 50%, respectively, in terms of pure alcohol content. Samples Nos. 19 to 24 were prepared by blending with a commercial product of authentic barley Shochu, such that the content of the unprocessed shiso-flavored Shochu in the alcoholic beverage would be 10, 15, 20, 30, 40 and 50%, respectively, in terms of pure alcohol content. The pure alcohol content describes the volume of alcohol originating from a specific unprocessed liquor or spirit, relative to the total volume of alcohol contained in the alcoholic beverage of interest. The alcohol made from molasses through continuous distillation barely contains aroma components and presents no taste, no smell. Hence, from the results with sample Nos. 13 to 18 that were prepared by blending with the alcohol made from molasses through continuous distillation, it is estimated that similar results will be obtained by diluting the unprocessed shiso-flavored Shochu with water. On the other hand, a commercial product of authentic barley Shochu is rich with aroma components such as fusel alcohol and esters that are characteristic of liquors and spirits, so it can be estimated that the results with samples Nos. 19 to 24 that were prepared by blending with a commercial product of authentic barley Shochu are similar to the result obtained by diluting the unprocessed shiso-flavored Shochu with fragrant liquors or spirits.

A sensory evaluation was performed by a panel of five experienced judges. The criteria for rating were as follows.

Score 4: The fresh and natural fragrance of shiso is sensed intensely.
Score 3: The fresh and natural fragrance of shiso is sensed.
Score 2: The fragrance of shiso is recognized.
Score 1: No fragrance of shiso is sensed at all.

The scores the panelists gave were averaged by five and a sample with an average score of three was rated to have the fresh and natural flavor of shiso that was the characteristic feature of the present invention.

Table 9 shows the results with the alcoholic beverage samples that were prepared by blending the unprocessed shiso-flavored Shochu with the alcohol made from molasses through continuous distillation and Table 10 shows the results with the alcoholic beverage samples that were prepared by blending the unprocessed shiso-flavored Shochu with a commercial product of authentic barley Shochu; the items of interest were the pure alcohol content, the rating of sensory evaluation, the comments of the experienced judges, the amount of the aroma component (A), the total amount of aroma components (B), and their ratio (B)/(A).

TABLE 9

Sensory Evaluation of shiso-flavored Shochu Blended with Other Liquor or Spirit (1)

| No. | Pure alcohol content (%) of unprocessed shiso-flavored Shochu | Rating of sensory evaluation (in scores) | Comments of Panelists | Aroma component (mg/L) (A) | (B) | (B)/(A) |
|---|---|---|---|---|---|---|
| 13 | 10 | 2 | Only faintly reminiscent of shiso and no fresh aroma sensed. | 0.45 | 1.36 | 3.02 |
| 14 | 15 | 2 | The scent of shiso is sensed only slightly and no fresh aroma sensed. | 0.67 | 2.04 | 3.02 |
| 15 | 20 | 3 | The fresh character of shiso is sensed. | 0.90 | 2.71 | 3.02 |
| 16 | 30 | 3.4 | The fresh fragrance of shiso is sensed moderately. Overall quality is refreshing and mild. | 1.35 | 4.07 | 3.02 |
| 17 | 40 | 4 | The fresh fragrance of shiso is sensed intensely. The quality is refreshing but powerful. | 1.80 | 5.43 | 3.02 |
| 18 | 50 | 4 | The fresh fragrance of shiso is sensed intensely. The impression is rather heavy. | 2.25 | 6.79 | 3.02 |

As can be seen from the results in Table 9, the alcohol beverage that was diluted the unprocessed shiso-flavored Shochu with the alcohol made from molasses by consecutive fermentation, developed a fresh fragrance reminiscent of shiso when it contained about 2.5 mg/L of components in class (B). When it contained more than 4.0 mg/L of components in class (B), the fresh fragrance of shiso was intensified.

TABLE 10

Sensory Evaluation of shiso-flavored Shochu Blended with Other Liquor or Spirit (2)

| No. | Pure alcohol content (%) of unprocessed shiso-flavored Shochu | Rating of sensory evaluation (in scores) | Comments of Panelists | Aroma component (mg/L) (A) | (B) | (B)/(A) |
|---|---|---|---|---|---|---|
| 19 | 10 | 1.6 | In addition to the intense aroma of barley Shochu, a flavor reminiscent of shiso was sensed slightly. The impression was that the barley Shochu developed a fruity flavor. | 0.45 | 1.36 | 3.02 |
| 20 | 15 | 2 | In addition to the intense aroma of barley Shochu, the light character of shiso was recognized. | 0.67 | 2.04 | 3.02 |

TABLE 10-continued

Sensory Evaluation of shiso-flavored Shochu Blended with Other Liquor or Spirit (2)

| No. | Pure alcohol content (%) of unprocessed shiso-flavored Shochu | Rating of sensory evaluation (in scores) | Comments of Panelists | Aroma component (mg/L) | | |
|---|---|---|---|---|---|---|
| | | | | (A) | (B) | (B)/(A) |
| 21 | 20 | 2.4 | In addition to the intense aroma of barley Shochu, the light, fresh character of shiso was recognized. | 0.90 | 2.71 | 3.02 |
| 22 | 30 | 3.2 | In addition to the intense aroma of barley Shochu, the hidden scent of shiso is sensed. | 1.35 | 4.07 | 3.02 |
| 23 | 40 | 3.6 | In addition to the intense aroma of barley Shochu, the hidden scent of shiso is sensed definitely. | 1.80 | 5.43 | 3.02 |
| 24 | 50 | 3.8 | The flavor of shiso is sensed in barley Shochu. The hidden scent of shiso is sensed definitely. | 2.25 | 6.79 | 3.02 |

As can be seen from the results in Table 10, the alcohol beverage that was diluted the unprocessed shiso-flavored Shochu with the liquor or spirit of intense smell, allowed the fresh character of shiso to be recognized lightly when it contained about 2.5 mg/L of components in class (B). When it contained more than 4.0 mg/L of components in class (B), the fresh fragrance of shiso developed distinctly. The fresh fragrance of shiso was more intense when the content of components in class (B) was greater than 5.4 mg/L.

Example 4

Production of Shiso-Flavored Shochu (3)

(Brewing)
Unprocessed shiso-flavored Shochu was produced from barley as in Example 1, except that the dry koji rice and the pregelatinized rice were replaced by dry koji barley and steamed barley, respectively. The steamed barley was such that a grade of barley suitable for making Shochu was steamed to give a post-steaming water content of ca. 35-40% by weight.

The dry koji barley (white) and the grade of barley suitable for making Shochu were each purchased from IIDA TRADING CO., LTD. The yeast was Kyokai No. 2 (purchased from the Brewing Society of Japan). Kyokai No. 2 was reconstituted with water as prescribed and added such that the number of viable cells in primary moromi would be ca. $5 \times 10^5$/mL. Commercially available green shiso (ohba) was used. It was well washed with water, cut into eight pieces, and charged into secondary moromi. The primary moromi was fermented in a thermostatic chamber (28° C.) for seven days and the secondary moromi was fermented in the same thermostatic chamber for 11 days. The thus generated moromi (barley) for shiso-flavored Shochu had a volume of 12.14 L with an alcohol content of 17.2%.

(Distillation)
A 5-L capacity stainless steel pot still was charged with 3000 mL of the moromi and reduced pressure distillation was performed. Heating was performed in a thermostatic water tank. The degree of vacuum was adjusted at two levels of 150 and 200 mmHg. The distillation was ended at the point in time when the unprocessed shiso-flavored Shochu (barley) to be obtained was estimated to have an alcohol content of ca. 40-45%. The temperature of the moromi was measured both at the time when the first fraction distilled out and at the time when the distillation ended; the volume of the unprocessed shiso-flavored Shochu (barley) and its alcohol content were also measured. Note that the unprocessed shiso-flavored Shochu (barley) obtained in Example 4 is, strictly speaking, classified in the category of "Spirits" under the Japanese Liquor Tax Act but, being comparable to Shochu except in terms of alcohol content, it shall be referred to as "Shochu" for the sake of convenience.

(Sensory Evaluation)
The two samples of unprocessed shiso-flavored Shochu (barley) that were produced by distillation at different degrees of vacuum as described above were thinned with pure water to an alcohol content of 20% and then subjected to sensory evaluation by a panel of six experienced judges. The result of the sensory evaluation, the degrees of vacuum employed to prepare sample Nos. 25 and 26 by distillation, the amount charged (i.e., the amounts in which they were charged into the distillation vessel), the temperatures of moromi, the volumes of the unprocessed samples as obtained by distillation, and their alcohol contents are shown in Table 11. The "start" column associated with the temperature of moromi indicates the temperature of moromi at the time when the first fraction of distillate started to distill off whereas the "end" column indicates the temperature of moromi at the time when distillation ended.

The fresh and natural fragrance of shiso was recognized in sample No. 25 which was obtained by distillation at 150 mmHg, and the fresh and natural fragrance of shiso was sensed more intensely from sample No. 26 that was obtained by distillation at 200 mmHg. These samples had a light and refreshing scent, giving the impression that the somewhat oily, grass-like scent of perillaldehyde was masked.

Thus, the present invention was shown to exhibit its intended effect even when Shochu was made from barley. However, it was pointed out that compared to the case where Shochu was made from rice as in Examples 1 to 3, the unprocessed shiso-flavored Shochu made from barley was given the immaturity and stimulating effect that were peculiar to the barley Shochu; it was also pointed out that in order to obtain the "fresh and natural fragrance of shiso" which was characteristic of the present invention, the full and soft quality which was peculiar to liquors and spirits made from rice was more preferred to the quality of those made from barley.

TABLE 11

Profile of Distillation for the Production of Shiso-flavored Shochu (Barley) and Results of Sensory Evaluation

| Sample | | Distillation | | | Unprocessed Shochu | | |
| --- | --- | --- | --- | --- | --- | --- | --- |
| | Degree | | Temperature | | | | |
| | of vacuum | Amount charged | of moromi (° C.) | | Volume | ALC content | |
| No. | (mmHg) | (mL) | Start | End | (mL) | (%) | Quality |
| 25 | 150 | 3000 | 52.5 | 63.5 | 1040 | 46.5 | Fresh and natural fragrance of shiso was sensed. |
| 26 | 200 | 3000 | 60.5 | 71.0 | 1035 | 47.7 | Fresh and natural fragrance of shiso was intensified. |

The invention claimed is:

1. A process for producing a distilled liquor or spirit comprising the steps of:
 charging a distillation vessel of a pot still with an alcohol-containing distillation feed and *Perilla frutescens* var. *crispa*; and
 distilling the distillation feed at a reduced pressure between 150 mmHg (ca. 20 kPa) and 350 mmHg (ca. 46.7 kPa) to obtain the distilled liquor or spirit,
 wherein the temperature of the distillation feed at the time when the first fraction distills out is between 50° C. and 78° C.;
 wherein the temperature of the distillation feed at the end of distillation is between 55° C. and 90° C.; and
 wherein the *Perilla frutescens* var. *crispa* is one or more members selected from among:
 (1) leaves or stem of fresh *Perilla frutescens* var. *crispa*;
 (2) a dried, sheared, ground or enzymatically treated product of leaves or stem of fresh *Perilla frutescens* var. *crispa* and
 (3) a liquid extract obtained by extracting (1) or (2) with water or an aqueous solution.

2. The process according to claim 1, wherein the *Perilla frutescens* var. *crispa* is leaves and/or stem of fresh *Perilla frutescens* var. *crispa*, and the following aroma components (A) and (B):
 (A) perillaldehyde; and
 (B) one or more aroma components selected from the group consisting of limonene, cineol, linalool, benzaldehyde, α-pinene, and β-pinene;
are extracted in the distillation step, and wherein the total sum of the weights of components in group (B) is at least 4.0 mg in terms of pure alcohol per liter of the distilled liquor or spirit.

3. The process according to claim 1, wherein the distilled liquor or spirit is Shochu.

* * * * *